(12) United States Patent
Zunke

(10) Patent No.: US 7,730,529 B2
(45) Date of Patent: *Jun. 1, 2010

(54) METHOD OF OPERATING A COMPUTER SYSTEM AND COMPUTER SYSTEM

(75) Inventor: Michael Zunke, Aschheim (DE)

(73) Assignee: Aladdin Europe GmbH, Germering (DE)

(*) Notice: Subject to any disclaimer, the term of this patent is extended or adjusted under 35 U.S.C. 154(b) by 810 days.

This patent is subject to a terminal disclaimer.

(21) Appl. No.: 10/409,525

(22) Filed: Apr. 8, 2003

(65) Prior Publication Data

US 2003/0191961 A1 Oct. 9, 2003

(30) Foreign Application Priority Data

Apr. 8, 2002 (EP) .................... 02007846

(51) Int. Cl.
*G06F 17/30* (2006.01)
(52) U.S. Cl. ............... 726/18; 726/19; 726/21; 713/156; 713/157; 713/158
(58) Field of Classification Search ............ 726/17, 726/2; 380/277
See application file for complete search history.

(56) References Cited

U.S. PATENT DOCUMENTS

| | | | | |
|---|---|---|---|---|
| 5,204,897 A | * | 4/1993 | Wyman | 710/200 |
| 5,222,134 A | * | 6/1993 | Waite et al. | 705/59 |
| 5,260,999 A | * | 11/1993 | Wyman | 705/59 |
| 5,438,508 A | * | 8/1995 | Wyman | 705/8 |
| 5,455,953 A | * | 10/1995 | Russell | 710/266 |
| 5,473,692 A | * | 12/1995 | Davis | 705/59 |
| 5,553,143 A | | 9/1996 | Ross et al. | |
| 5,568,552 A | * | 10/1996 | Davis | 705/59 |
| 5,742,757 A | * | 4/1998 | Hamadani et al. | 726/32 |
| 5,745,879 A | * | 4/1998 | Wyman | 705/1 |
| 5,754,763 A | * | 5/1998 | Bereiter | 726/28 |
| 5,790,664 A | * | 8/1998 | Coley et al. | 709/203 |

(Continued)

FOREIGN PATENT DOCUMENTS

WO    WO 98/58306    12/1998

(Continued)

OTHER PUBLICATIONS

European Search Report.

(Continued)

*Primary Examiner*—Pramila Parthasarathy
(74) *Attorney, Agent, or Firm*—Drinker Biddle & Reath LLP

(57) ABSTRACT

A method of operating a computer system comprises the following steps:

installing an executable main module of a program on the computer system, storing module data for the main module and/or for an additional module (A, B, C, D) of the program in the computer system, said stored module data comprising a license part required to determine the presence of the use authorization of the main module and/or of the additional module, and preferably also comprising an information part, evaluating the stored module data for acquisition of a further use authorization for the additional module (A-D) or for a further additional module (A-D), and providing information for the acquisition of a use authorization as a function of the result of evaluation.

30 Claims, 2 Drawing Sheets

| Module | License | Internet address | Linkage | Version |
|---|---|---|---|---|
| A | 2(1) | y | 0 | 1.1 |
| B | 3(1) | z | 0 | 1.1 |
| C | 3(1) | z | B | 1.1 |
| D | 0 | x | 0 | 1.1 |
| H | 1 | x | 0 | 1.1 |

U.S. PATENT DOCUMENTS

| | | | | |
|---|---|---|---|---|
| 5,970,252 | A * | 10/1999 | Buxton et al. | 717/166 |
| 5,978,579 | A * | 11/1999 | Buxton et al. | 717/107 |
| 6,093,215 | A * | 7/2000 | Buxton et al. | 717/107 |
| 6,195,794 | B1 * | 2/2001 | Buxton | 717/108 |
| 6,343,280 | B2 * | 1/2002 | Clark | 705/55 |
| 6,769,053 | B1 * | 7/2004 | De Jong et al. | 711/156 |
| 7,121,639 | B2 * | 10/2006 | Plunkett | 347/13 |
| 7,143,409 | B2 * | 11/2006 | Herrero | 717/178 |
| 7,181,572 | B2 * | 2/2007 | Walmsley | 711/128 |
| 7,213,269 | B2 * | 5/2007 | Orthlieb et al. | 726/33 |
| 7,260,721 | B2 * | 8/2007 | Tanaka et al. | 713/170 |
| 2003/0177129 | A1 * | 9/2003 | Bond et al. | 707/100 |
| 2007/0106981 | A1 * | 5/2007 | Bird | 717/127 |

FOREIGN PATENT DOCUMENTS

| | | |
|---|---|---|
| WO | WO 01/79970 | 10/2001 |

OTHER PUBLICATIONS

Installation Quick Start, 2000, *Rational Software Corporation* .pp. 1-8.

Rational Rose 2000e Installation Guide. 2000. Part No. 800-023380-000.

* cited by examiner

| Module | License | Internet address | Linkage | Version |
|---|---|---|---|---|
| A | 0 | x | 0 | 1.1 |
| B | 0 | x | 0 | 1.1 |
| C | 0 | x | B | 1.1 |
| D | 0 | x | 0 | 1.1 |
| H | 1 | x | 0 | 1.1 |

Fig. 3

| Module | License | Internet address | Linkage | Version |
|---|---|---|---|---|
| A | 2(1) | y | 0 | 1.1 |
| B | 0 | x | 0 | 1.1 |
| C | 0 | x | B | 1.1 |
| D | 0 | x | 0 | 1.1 |
| H | 1 | x | 0 | 1.1 |

Fig. 4

| Module | License | Internet address | Linkage | Version |
|---|---|---|---|---|
| A | 2(1) | y | 0 | 1.1 |
| B | 3(1) | z | 0 | 1.1 |
| C | 3(1) | z | B | 1.1 |
| D | 0 | x | 0 | 1.1 |
| H | 1 | x | 0 | 1.1 |

Fig. 5

METHOD OF OPERATING A COMPUTER SYSTEM AND COMPUTER SYSTEM

This application claims priority to European Application No. 02007846.5 filed Apr. 8, 2002. Said application is incorporated by reference herein.

BACKGROUND OF THE INVENTION

The invention relates to a method of operating a computer system and to a computer system.

In a known method of operating a computer system, on which an executable main module of a program is installed, it is not possible to obtain a separate use authorization for an additional module of the program usable in connection with the main module. It is required to contact the program manufacturer in order to obtain a completely new user licence, which is then also valid for the additional module.

In view thereof, it is an object of the invention to provide a method of operating a computer system and a computer system allowing a user licence for an additional module of a program to be obtained more easily.

SUMMARY OF THE INVENTION

According to the invention, this object is achieved by a method of operating a computer system, said method comprising the following steps: installing an executable main module of a program on the computer system, storing module data for the main module and/or for an additional module of the program in the computer system, said stored module data comprising a license part required for determining the presence of a use authorization for the main module and/or for the additional module and, preferably, further comprising an information part, evaluating the stored module data for acquisition of a further use authorization for the additional module or for a further additional module, and providing information for the acquisition of a use authorization as a function of the result of said evaluation.

The method according to the invention takes account of the state of the computer system or the use authorization situation when providing said information, so that the current use authorization situation can be taken into consideration when acquiring said use authorization. This makes it easier for the site granting such user license to generate customer-specific offers.

Also, information such as, for example, technical specifications of the computer system and its current status (processor used, operating system, already acquired use authorizations, . . . ), may be provided, allowing a licensing site, operated or authorized by the program manufacturer, to grant use authorizations. The method according to the invention allows the acquisition of the use authorization to be greatly varied.

A further advantage of the method according to the invention is that an individual use authorization can be granted or acquired for each additional module, which authorization may correspond to the use authorization of another additional module or of the main module, or which may differ, partially or completely, from said use authorization (in particular with regard to the type of use authorization).

In this case, a main module of the program is understood to be a module which is executable without the additional modules. An additional module is a module which is preferably executable in combination with the main module. The additional module may also be a module which is executable only in connection with the main module or only if the main module is installed. The module data for the main module or for the additional module comprise a license part required to determine the presence of a use authorization. It may also contain further information which is independent of the use authorization. Alternatively, the module data for the main module may also contain only such data which are independent of the use authorization, if the module data for the additional module comprise a license part or contain information showing that no special license data is stored for the main module.

In the evaluating step, for example, the license part and/or the information part of the module data for the additional module, the module data for the main module, or the module data for both the main module and the additional module together, may be evaluated.

The information part may include, for example, the version number of the corresponding module. Said version number can be taken into account when acquiring a use authorization. Thus, for example, an upgrade of the corresponding module, or also of a different module, may be offered, wherein, in case such upgrade is effected, only those data or files are transmitted which are required for this special upgrade. This allows to minimize the data volume to be transmitted, which leads to shorter transmission times, in particular during transmission via networks (e.g. the internet) compared with an upgrade requiring consideration of the most diverse basic configurations of the program on the computer system to be considered, as was previously the case.

It is particularly advantageous if, in addition to managing the license data (the license part), a license manager also manages the information part, it being possible, in particular, also to manage information parts for additional modules for which no license has been granted yet. This allows individual offers to be generated for acquiring a license with the help of the license manager or on the basis of the data it manages.

In particular, the evaluating step and/or the providing step can be carried out directly, or indirectly, by the license manager. The license manager may be part of the program or may also be a separate program. Further, the license manager may be used not only to verify the license of the program, but also to verify the licenses of further programs.

Storage of the module data for the main module and/or the additional module may be effected during or after installation of the main module. In particular, the module data for the main module and for the additional module may be stored at different times. Thus, for example, the module data for the main module may be stored during installation, and the module data for the additional module may be stored upon acquisition of a use authorization. It is also possible to store module data for not yet licensed additional modules (for which, for example, no license is present yet), which additional modules may, or may not, be present on the computer system. The module data for not yet licensed additional modules may be considered in the evaluating step.

In particular, the method according to the invention allows to provide information which may contain an address of a licensing site from which a or the further use authorization for the additional module may be acquired. Thus, said address may be dynamically adapted to the current use authorization situation or dynamically determined, allowing the user to be selectively connected with the corresponding licensing site.

As used herein, an address of a licensing site is understood to be any information allowing the licensing site to be contacted. Thus, said address may be a postal address, a phone or fax number, an e-mail address, and in particular also an internet address or another address of a computer network, for example, of a publicly accessible or an in-house network or network area.

The licensing site is understood herein to be any remote site which can be reached at said address. In the case of an in-house network or network area, the licensing department may be a special computer, which manages a license pool acquired by the firm and grants licenses (user licenses) within the firm. As regards an internet address, the corresponding licensing site is the internet page, which is clearly identified by its address.

Thus, it may be achieved that, in order to acquire the further user license, the same dealer from whom a user license was already obtained for the main module or for the additional module is contacted. Thus, this repeated business establishes a binding relationship with the dealer.

Further, methods according to the invention allow the module data to be evaluated in the evaluating step in terms of the use authorization, in particular the type of use authorization, of the additional module and/or the main module. For example, this allows the same type of use authorization to be offered first during acquisition of the further use authorization (or license), so that a license may be quickly acquired by the user. It is also possible to offer the same license period for the additional module as that present for the main module (e.g. temporally limited or temporally unlimited period of use). Possible types of use authorization include temporally unlimited use, temporally limited uses, commercially available or free use authorizations, use authorizations allowing only a predetermined number of program call-ups, of projects executable by means of the program, of printouts or of other program-dependent actions.

A particularly preferred embodiment of the method according to the invention consists in that the providing step provides information which includes details concerning the present use authorization situation of the main module and/or of the additional module(s). These details, which may preferably be transmitted to the licensing site, allow easy further personalization of the offer during acquisition of the further use authorization. Since said information needs to be provided on the basis of the module data stored in the computer system, the licensing site need not store any data concerning already acquired use authorizations and can, nevertheless, generate an offer adapted to the current use authorization situation.

Further, the method according to the invention allows the module data to be managed directly or indirectly, via the main module or a separate license module which can be called up by the main module. In this way, the relevant module data are available at the user (e.g. in the computer system) and may be easily updated all the time, so that the current use authorization situation or the current status of the system can always be determined.

According to a particular further embodiment of the method according to the invention, providing the information comprises generating and outputting (preferably on a screen or another output unit of the computer system) a menu comprising selectable menu items, said menu items being determined as a function of the result of evaluation. For example, this allows to define, as the first menu item, the acquisition of a type of use authorization which corresponds to the already acquired use authorization. The first menu item, for example, is that menu item which is the biggest, which is preselected or which is the first to be noticed by the user.

Moreover, in a preferred further embodiment of the method according to the invention, it may be verified on the basis of the stored module data, as soon as an additional module is called up, whether there is a use authorization for the called-up additional module, and if there is such use authorization, the called-up additional module is executed, while, if there is no such use authorization, the evaluating step and the providing step are carried out. This allows acquisition of use authorizations for additional modules to be carried out easily during execution of the program.

Also, in already existing programs which carry out a verification of the use authorization upon call-up of an additional module, an extension of the method according to the invention is easily obtained by correspondingly extending the already existing verification. Since, in order to carry out said verification, a separate file is called up in many cases, said extension is easily achieved by replacing said file. If a license manager is called up by the program in order to verify the use authorization, the license manager may be accordingly changed or extended.

Further, in the method according to the invention, module data relating to the acquisition of a use authorization and/or to the additional module can be stored in the computer system after acquisition of the further use authorizations. This enables an update in terms of the use authorization situation of the additional modules.

In particular, on the basis of the information provided, the method according to the invention allows to automatically establish a connection with a licensing department where said use authorization can be acquired. This leads to a further simplification of the acquisition of a use authorization. An automatically established connection means, for example, that the system itself establishes a data connection, or that the user establishes a connection with the internet or another network, and that the system then automatically calls up the corresponding address.

Further, the licensing site can generate module data (in particular for the additional module, for which a use authorization has been acquired) and effect their transmission to the computer system. This allows the licensing site to consider the acquired use authorization directly when generating the module data, so that the update of the module data stored in the computer system is guaranteed.

It is also possible that the licensing site may effect transmission, to the computer system, of the additional module for which a use authorization has been acquired, or of components of or supplements to the additional module. This allows online-acquisition of an additional module to be easily realized, including the corresponding use authorization.

In a preferred embodiment of the method according to the invention, the stored module data are evaluated in order to acquire a further use authorization for the main module and information required to acquire such use authorization is provided as a function of the result of evaluation. Thus, also in acquiring a further use authorization for the main module, the current use authorization situation can be considered, for example, in order to be able to generate specially adapted offers for acquisition of such use authorization.

In particular, module data concerning the acquisition of a use authorization may be stored in the computer system after acquisition of the further use authorization for the main module. Thus, the current use authorization situation is stored in the computer system and may be used for future acquisition of another use authorization for the main module and/or for an additional module.

The problem is also solved by a computer system on which an executable main module of a program is installed, said computer system comprising an updating means which stores module data, said data comprising a license part required for determining the presence of the use authorization and preferably also comprising an information part, in the computer system in which module data for the main module are preferably stored, after acquisition of a use authorization for an additional module of the program, said computer system further comprising an evaluating unit which evaluates the stored module data for acquisition of a further use authorization for the additional module or for a further additional module, as well as a providing unit which provides the information for acquisition of such use authorization as a function of the result of evaluation.

Thus, using the computer system according to the invention, information for acquisition of a use authorization is determined and provided as a function of the result of evaluation and, consequently, as a function of the state of the computer system, so that an individually adapted offer can easily be generated during acquisition of the desired use authorization. Also, on the basis of the module data collection in which the corresponding module data are stored, different use authorizations can be acquired for different additional modules.

The computer system according to the invention is preferably embodied such that the above-described method steps of the method for operating a computer system are executable.

The invention will be explained in more detail below, by way of example and with reference to the drawings, wherein:

DESCRIPTIONS OF THE FIGURES

FIG. 3 shows a schematic view of the module data collection;

FIG. 4 shows a schematic view of the module data collection, and

FIG. 5 shows a schematic view of the module data collection.

DETAILED DESCRIPTION OF THE PREFERRED EMBODIMENTS

Figure 1:
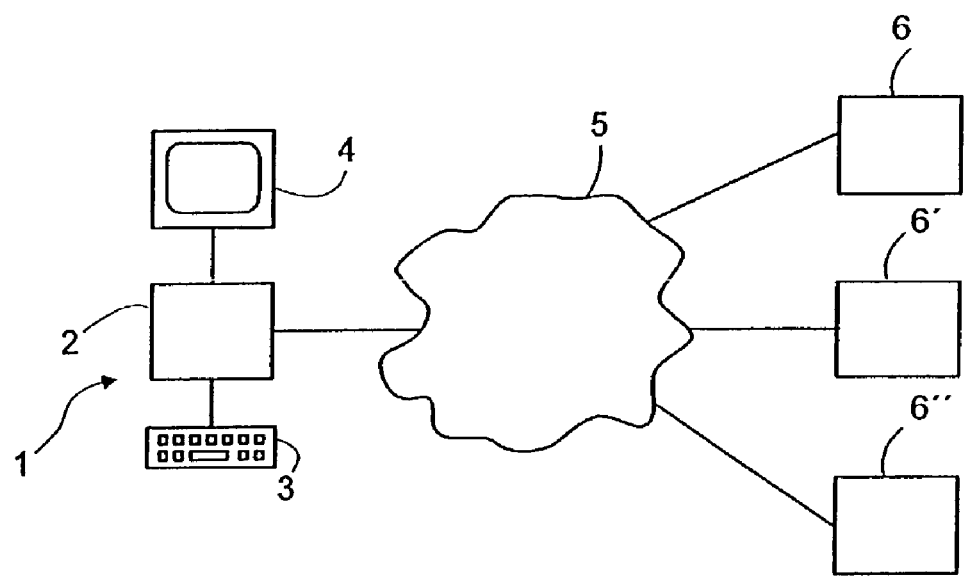
FIG. 1 shows a schematic view of the computer system according to the invention.

FIG. 1 schematically shows a computer system 1 according to the invention, on which an executable main module of a program is installed, which comprises at least one additional module which is executable in combination with the main module. In this case, the computer system 1 comprises a computing section 2 (comprising, for example, a processor, a hard disk, further hardware elements as well as an operating system), an input unit 3 (in this case, for example, a keyboard) as well as an output unit 4 (e.g. a screen). Further, the computer system 1 is embodied such that it is connectable with licensing sites 6, 6', 6" via an internet connection 5.

Figure 2:
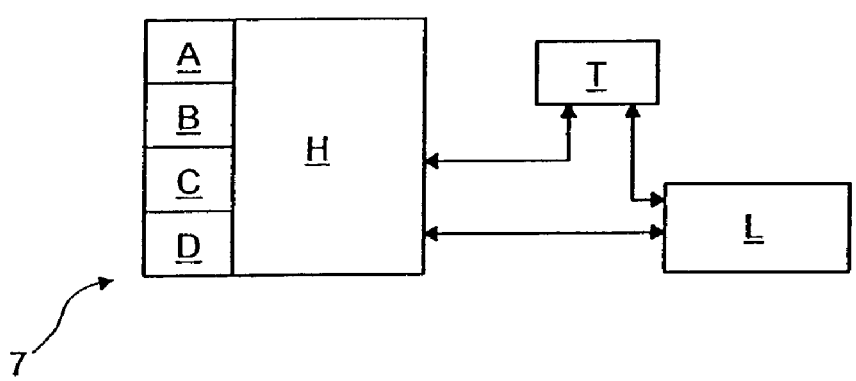
FIG. 2 shows a schematic view of an application installed on the computer system.

FIG. 2 schematically shows the program 7 installed on the computer system 1 and the interaction between its components, said program 7 comprising the installed main module H, four additional modules A, B, C, D, a license manager L as well as a module data collection T. The main module H and the license manager L are installed in an executable manner. However, in the presently described example, no authorization is present yet for execution of the additional modules A-D which are executable in combination with the main module. This use authorization situation is stored in the module data collection T, which may be organized, for example, as a table, as schematically represented in FIG. 3.

The program 7 (or the application 7) may be, for example, a construction software for architects, with the main module H allowing the construction of buildings, the additional module A allowing execution of special structural analysis calculations, the additional module B allowing to generate perspective views which may be printed out on a printer by means of the additional module C, and the additional module D serves to generate circuit layouts for electrical installations.

Module data comprising a license part and an information part are stored for each module A-D and H in the module data collection T (FIG. 3). The license part comprises the present license (or run authorization) required to determine the presence of the run authorization, and the information part comprises further module-related details, such as, for example, an internet address, a link as well as a version number of the module A-D, H.

In this case, the entry "0" in the license column means that no use authorization is present for the corresponding module, the entry "1" representing an unlimited use authorization. An entry "2(1)" indicates a use which is charged for and is temporally limited, with the figure in brackets indicating the period of use in months, and an entry "3(1)" represents a use free of charge, with the figure in brackets again indicating the period of use in months. In addition to the types of license described herein by way of example, further types of license are also possible, such as, for example, a license limiting the duration of the actual use of the corresponding module.

In the internet address column, an internet address "x" is indicated, with which one can be connected, as will be described below, in order to acquire a use authorization for the corresponding module A-D.

The "linkage" column shows whether the corresponding module A-D is executable only together with another module. If this is the case, the designation of the corresponding module is entered, and if this is not the case, "0" is entered.

In the version column, a version number of the corresponding module A-D, H is indicated, with a version number 1.1 being entered here for all modules. For example, the version number may be structured such that it indicates for which computer or for which target system (in particular for which operating system) the corresponding module has been developed and is employed.

Thus, it is evident from the module data collection T shown in FIG. 3 that a temporally unlimited use authorization is present only for the main module H, that there is no license for the additional modules A-D, so that said additional modules A-D can not be executed and used, and that the additional module C is executable only together with the additional module B.

Now, if the additional module A is called up during execution of the application 7, the main module H verifies, together with the license manager L (or, for example, the called up additional module A, together with the license manager L), on the basis of the module data collection T, whether the corresponding run authorization is present. In the presently described case, "0" is entered in the "license" column for the module A, which means there is no use authorization. The main module H (or the additional module A) and the license manager L, which are installed on the computer system, thus form an evaluating unit for evaluating the module data.

Following this, a message is displayed on the screen 4 that no license is present for this module A, but that it may be acquired. For this purpose, for example, the selectable options of "acquire license" and "return to main module" may be provided to the user. The display of the selectable options may be generated, for example, as a function of details of the information part of the module data. Thus, for example, corresponding information pertaining thereto may be placed in a further column (not shown).

If the user chooses the selectable option of acquiring a license, the internet address x is read out from the corresponding line for the additional module A in the module data collection T by the main module H (or by the additional module A) and/or by the license manager L. In this manner, the main module (or the additional module A) and/or the license manager form a providing unit which provides information in the form of the internet address. This information is immediately used such that a connection to the internet address x is automatically established.

A licensing site 6, from which an run authorization for the additional module A may be acquired, can be reached at said internet address x. Thus, the user is automatically guided to or connected with the appropriate licensing site.

If, for example, the version number is also provided, in addition to the internet address, this may be transmitted via the automatically established connection with the licensing site. Thus, on the basis of the version number transmitted, the licensing site 6 may determine, for example, whether a supplementary module exists to remedy errors in the additional module A which have become known, or whether newer versions of the additional module A exist.

It is assumed that the user is acquiring a use authorization, which is charged for and temporally limited, for one month.

The acquired use authorization or the module data reflecting it and, as the case may be, the supplementary module, are transmitted to the computer 1 via the internet connection 5, and the main module H (or the additional module A) and/or the license manager L (updating means) store the module data in the module data collection T. Thus, for example, for the additional module A, the license column indicates the type and duration of said license, and the internet address x is replaced by an internet address y, which leads, for example, directly to the internet page or to the licensing site 6' for acquisition of a temporally limited license. The module data collection T, which is thus updated, is shown in FIG. 4.

If the use authorization for the additional module A has expired and the additional module A is subsequently called up, the process described in connection with the first-time acquisition of a license runs again, but this time y is read out and provided as the internet address, so that, when the connection is automatically established, the licensing site 6' or the internet page for acquisition of temporally limited use authorizations is directly called up. In this way, depending on the type of the (meanwhile expired) license of the additional module A, an address of a corresponding licensing site is determined, which simplifies the acquisition of a license for the user. Upon acquisition of the run authorization, the described update of the module data collection T is effected again.

If the user now wishes to acquire authorization also for the use of the additional module C, he may start to acquire said license by calling up the module, as described above with regard to module A. However, it is also possible to select acquisition of a license for the module C by means of a procedure implemented within the main module H.

In this case, the main module H (or the additional module C) and/or the license manager L accesses the module data collection T and evaluates the data associated with the additional module C. Thus, the internet address x is read out, and it is found, by means of the entry "B" in the linkage column, that the additional module B is required for execution of the additional module C.

A connection to the internet address x is automatically established, and the information that the additional module C is executable only together with the additional module B is transmitted to said address. This enables the licensing site 6 to generate a correspondingly adapted offer for the user.

It is assumed that the user is offered the use of the additional modules B and C, free of charge, for the duration of one month, which he accepts. This use authorization is transmitted to the computer 1 via the internet connection 5 and entered into the license column, and the internet address x for the modules B and C is replaced by the internet address z, at which special offers are present for acquisition of a follow-up use authorization for modules B and C. The module data collection T changed in this manner is shown in FIG. 5.

The above-described method provides information for acquisition of a use authorization, such as the address of a licensing department, as a function of the presently existing use authorization situation which is stored in the module data collection T and is continuously updated. Thus, it is possible, to generate, in the most simple way, customer-specific offers for acquisition of a use authorization for an additional module.

Of course, it is also possible that the additional modules A-D are not yet installed on the computer system 1, but are transmitted to the computer system 1, and installed there, only upon (first-time) acquisition of a corresponding use authorization. For this purpose, the already existing internet connection 5 between the computer system 1 and the licensing site 6 may be directly used.

The method according to the invention is also particularly easy to integrate into already existing applications, wherein a verification of the presence of the run authorization is already implemented upon call-up of an additional module. Said verification may be used in order to carry out the above-described steps if the corresponding run authorization is not present.

Since, for example, in programs for the Windows operating system, a corresponding verification file (for example, a .dll file; dynamic-link-library file) is called up for such verification, there is no need for a change in the program routine of license verification process of the program. It is merely required to replace the verification file by another verification file, using which the method according to the invention can then be carried out.

The license manager L, which has been described as part of the program 7, may also be a separate program, which is used to verify the license for the program 7 and, as the case may be, also for further programs.

Although the description above contains many specificities, these should not be construed as limiting the scope of the invention but as merely providing illustrations of some of the presently preferred embodiments of the invention. Thus, the scope of the invention should be determined by the appended claims and their legal equivalents, rather than by the examples given.

The invention claimed is:

1. A method of operating a computer system to execute a program having a first module and a second module, wherein use of the first module and the second module is governed by one or more user licenses grantable by a licensor, said method comprising:

installing an executable first module of the program on the computer system;

storing module data associated with at least the first module in the computer system, the module data comprising a license part having information that is indicative of a presence of a use authorization to use the first module;

obtaining, by the computer system, use information based upon the module data, the use information including information relating to past license usage and license status of the first module; and receiving, by the computer system, from the licensing site associated with the licensor and distinct from the computer system, a customer-specific offer for an acquisition of a use authorization for the second module, wherein the customer-specific offer is based at least in part on use information corresponding to the first module.

2. The method as claimed in claim 1, wherein the storing of the module data includes storing information that indicates a network address of the licensing site.

3. The method as claimed in claim 1, further comprising evaluating the module data to determine a type of use authorization of the first module.

4. The method as claimed in claim 1, further comprising managing the module data directly or indirectly, by a license manager.

5. The method as claimed in claim 1, further comprising:
initiating a call-up of the first module; and
in response to the initiating of the call-up of the first module:
initiating automatically generating of the use information.

6. The method as claimed in claim 1, further comprising storing module data relating to the acquisition of the use authorization in the computer system after acquisition of the use authorization.

7. The method as claimed in claim 1, further comprising generating, by the licensing site, module data which are transmitted to the computer system.

8. The method as claimed in claim 1, further comprising transmitting, to the computer system, in response to acceptance of the customer-specific offer, at least one component of the program selected from the group consisting of: the second module, a component of the second module, and a supplement to the at least one second module for which new use authorization is acquired.

9. The method as claimed in claim 8, wherein installing at least one second module occurs in response to the transmitting of at least one component of the program.

10. The method as claimed in claim 1, further comprising storing, in the computer system, module data concerning the acquisition of an authorization to use the first module or the second module after acquisition of such use authorization.

11. The method as claimed in claim 1, further comprising automatically evaluating module data of the first module to determine a type of use authorization to be offered for the second module in the customer-specific offer.

12. The method as claimed in claim 11, wherein automatically evaluating module data of the first module includes producing module information and providing the use information includes providing the module information.

13. The method as claimed in claim 1, wherein obtaining use information based upon the module data includes initiating, by the computer system, the acquisition process in response to user interaction with the first module.

14. The method as claimed in claim 1, further comprising connecting, by the computer system, to the licensing site based on the use information, wherein the connection is used by the licensing site to provide the customer-specific offer.

15. The method of claim 1, wherein providing the use information includes providing technical specifications of the computer system.

16. The method of claim 1, wherein providing the use information includes providing a version number of the first module.

17. The method of claim 1, wherein providing the use information includes indicating whether the second module is licensed.

18. The method of claim 1, wherein providing the use information includes establishing an internet connection.

19. The method of claim 1, wherein providing the use information includes establishing a network connection.

20. The method of claim 1, wherein providing the customer specific offer includes operating the licensing site under authority, or on behalf, of the licensor.

21. A computer system, on which a program is installed having a first module and a second module, wherein use of the first module and the second module is governed individually by a user license grantable by a licensor, the computer system comprising:
an updating unit adapted to store acquired module data in the computer system, the acquired module data comprising a license part used to determine a presence of a use authorization for the first module, and
an acquisition unit adapted to obtain use information based on the stored module data, the use information including information relating to past license usage and license status of the first module, receive a customer-specific offer based on use information corresponding to the first module for an acquisition of an authorization to use the second module, the licensing site being associated with the licensor and distinct from the computer system.

22. The computer system as claimed in claim 21, wherein the acquisition unit is adapted to automatically establish a connection with the licensing site via a first network address associated with the licensing site, the first network address being stored in the license part.

23. The computer system as claimed in claim 21, wherein the license part includes information based on a previously acquired use authorization for the first module.

24. The computer system of claim 21, wherein the use information provided to the licensing site by the acquisition unit is specific to the customer-specific offer, the customer-specific offer being generated by the licensing site.

25. The computer system of claim 21, wherein the use information comprises technical specifications of the computer system.

26. The computer system of claim 21, wherein the use information comprises a version number of at least one of the at least one first module.

27. The computer system of claim 21, wherein the use information indicates whether at least one of the first module and the second module is licensed.

28. The computer system of claim 21, further comprising an internet connection between the computer system and the licensing site.

29. The computer system of claim 21, further comprising a network connection between the computer system and the licensing site.

30. The computer system of claim 21, wherein the licensing site is adapted to be operated under authority, or on behalf, of the licensor.

* * * * *